United States Patent
Iwamura et al.

(10) Patent No.: US 8,229,120 B2
(45) Date of Patent: Jul. 24, 2012

(54) MOBILE COMMUNICATION METHOD

(75) Inventors: Mikio Iwamura, Yokohama (JP); Wuri Andarmawanti Hapsari, Yokosuka (JP); Shogo Yabuki, Yokosuka (JP); Alf Zugenmaier, Munich (DE)

(73) Assignee: NTT DOCOMO, Inc., Tokyo (JP)

( * ) Notice: Subject to any disclaimer, the term of this patent is extended or adjusted under 35 U.S.C. 154(b) by 0 days.

(21) Appl. No.: 12/989,939

(22) PCT Filed: Jun. 26, 2009

(86) PCT No.: PCT/JP2009/061746
§ 371 (c)(1),
(2), (4) Date: Jan. 21, 2011

(87) PCT Pub. No.: WO2009/157547
PCT Pub. Date: Dec. 30, 2009

(65) Prior Publication Data
US 2011/0124358 A1    May 26, 2011

(30) Foreign Application Priority Data
Jun. 27, 2008  (JP) .................. 2008-169669

(51) Int. Cl.
*H04K 1/00*   (2006.01)
(52) U.S. Cl. .................. 380/273

(58) Field of Classification Search .......... 380/273, 380/279, 280, 286; 455/507; 709/221, 228
See application file for complete search history.

(56) References Cited

U.S. PATENT DOCUMENTS

| | | | |
|---|---|---|---|
| 7,936,880 B2* | 5/2011 | Huang et al. | 380/272 |
| 7,986,940 B2* | 7/2011 | Lee et al. | 455/411 |
| 8,046,581 B2* | 10/2011 | Netanel | 713/168 |
| 2006/0200678 A1* | 9/2006 | Yamada et al. | 713/182 |
| 2008/0059792 A1* | 3/2008 | Feder et al. | 713/155 |
| 2008/0095359 A1* | 4/2008 | Schreyer et al. | 380/44 |
| 2009/0052397 A1* | 2/2009 | Meylan | 370/331 |
| 2009/0061878 A1* | 3/2009 | Fischer | 455/436 |

OTHER PUBLICATIONS

3GPP TSG-RAN WG2 Meeting #59, "Shared Secret for RLF Recovery", Aug. 2007, pp. 1-3.*

*Primary Examiner* — Beemnet Dada
(74) *Attorney, Agent, or Firm* — Osha Liang LLP

(57) ABSTRACT

A mobile communication method according to the present invention communicates between a mobile station (UE) and a radio base station (eNB) by using a certain key. The method includes the step of: (A) acquiring, at a radio base station managing a re-establishment target cell for the mobile station (UE), a first key ($K_{eNB[n+1]}$) for generating a certain key from a switching center (MME) in a procedure for re-establishment of the mobile station (UE), the certain key to be used for communication between the mobile station (UE) and a next re-establishment target cell for the mobile station (UE).

8 Claims, 7 Drawing Sheets

OTHER PUBLICATIONS

3GPP TS 33.401 V1.1.0, "Technical Specification Group Services and System Aspects; 3GPP System Architecture Evolution; Security Architecture," Apr. 2008, pp. 25-28 (5 pages).

3GPP TR 33.821 V0.8.0, "Technical Specification Group Services and System Aspects; Rationale and track of security decisions in Long Term Evolved (LTE) RAN / 3GPP System Architecture Evolution (SAE)," Apr. 2008, pp. 73-76 (5 pages).

3GPP TS 36.300 V8.5.0, "Technical Specification Group Radio Access Network; Evolved Universal Terrestrial Radio Access (E-UTRA) and Evolved Universal Terrestrial Radio Access Network (E-UTRAN)," May 2008 (134 pages).

Office Action issued on Sep. 15, 2010 in corresponding Japanese Application No. 2008-169669, with translation and verification, 7 pages.

International Search Report issued in PCT/JP2009/061746, mailed on Sep. 29, 2009, with translation, 3 pages.

Written Opinion issued in PCT/JP2009/061746, mailed on Sep. 29, 2009, 4 pages.

Office Action for Mexican Patent Application No. MX/a/2010/012287 dated Sep. 15, 2011, with English translation thereof (4 pages).

Extended European Search Report for Application No. 09770257.5 dated Aug. 11, 2011 (6 pages).

* cited by examiner

US 8,229,120 B2

MOBILE COMMUNICATION METHOD

TECHNICAL FIELD

The present invention relates to a mobile communication method for communicating between a mobile station and a radio base station using a certain key.

BACKGROUND ART

A conventional mobile communication system of the LTE (Long Term Evolution) scheme specified by the 3GPP is configured to communicate between a mobile station UE and a radio base station eNB using a certain key.

The certain key includes, for example, a key $K_{RRC\_Ciph}$ used for "Ciphering" in an RRC protocol, which is a C-plane protocol between the mobile station UE and the radio base station eNB (Access Stratum, AS), a key $K_{RRC\_IP}$ used for "Integrity Protection" in the RRC protocol, and a key $K_{UP\_Ciph}$ used for "Ciphering" in a U-plane protocol between the mobile station UE and the radio base station eNB (Access Stratum, AS) and the like. These certain keys are generated using a first key $K_{eNB}$.

Using the same key as any of the certain keys and the first key $K_{eNB}$ for a long time is not preferable because it makes the system's security vulnerable. For this reason, a procedure for updating such a certain key or a first key $K_{eNB}$ during handover is devised by the 3GPP.

Here, operations of a radio base station (Target eNB) managing a re-establishment target cell to acquire a first key $K_{eNB}^{**}$ used for generating a certain key in the re-establishment procedure for a mobile station UE are described referring to FIG. 8.

As shown in FIG. 8, first, a radio base station (Source eNB) managing a re-establishment source cell generates an intermediate key $K_{eNB}^{*}$, based on a stored first key $K_{eNB}$, a parameter "Next Hop", a parameter "Handover Type" representing a handover type and a parameter "Target PCI" representing identification information of a handover target cell.

Secondly, the radio base station (Source eNB) managing a re-establishment source cell transmits the generated intermediate key $K_{eNB}^{*}$ to the radio base station (Target eNB) managing the re-establishment target cell.

Thirdly, the radio base station (Target eNB) managing the re-establishment target cell generates the first key $K_{eNB}^{**}$ used for generating a certain key at the radio base station (Target eNB) managing the re-establishment target cell, based on the received intermediate key $K_{eNB}^{*}$ and "C-RNTI (Call Radio Network Temporary ID)" allocated by the re-establishment target cell.

DISCLOSURE OF THE INVENTION

Problem to be Solved by the Invention

However, as described above, the conventional re-establishment procedure in the mobile communication system has a problem that both a radio base station (Source eNB) managing re-establishment source cell and radio base station (Target eNB) managing a re-establishment target cell have to use a plurality of parameters and function to generate a first key $K_{eNB}^{**}$ used at the radio base station (Target eNB) managing the re-establishment target cell.

In particular, there is a problem that both radio base station (Source eNB) managing a re-establishment source cell and radio base station (Target eNB) managing a re-establishment target cell have to use $K_{eNB}$ conversion functions (Key Derivation Function, KDF) different in parameters for each of the radio base stations, and a mobile station UE also has to be provided with these KDFs, whereby the procedure is complicated.

Furthermore, it is cumbersome that $K_{eNB}$ needs to be updated according to PCI (Physical Cell ID) of the re-establishment target cell.

In particular, in the case where the procedure is dependent on the PCI, when a mobile station UE tries re-establishment to a different cell under control of a radio base station with "UE context" existing at the radio base station, the re-establishment may be rejected due to mismatching of the certain keys between the mobile station UE and the radio base station.

Furthermore, there is a restriction in flexible changing of the allocation of C-RNTI, since $K_{eNB}$ needs to be updated according to C-RNTI.

Therefore, the present invention has been made in view of the above-described problems, and an object of the present invention is to provide a mobile communication method in which a first key used by a radio base station (Target eNB) managing a re-establishment target cell can be generated through a simplified procedure.

Solution to Problem

A first aspect of the present invention is summarized as a mobile communication method for communicating between a mobile station and a radio base station by using a certain key, the method including the step of: (A) acquiring, at a radio base station managing a re-establishment target cell for the mobile station, a first key for generating a certain key from a switching center in the procedure for re-establishment of a mobile station, the certain key to be used for communication between the mobile station and a next establishment target cell for the mobile station.

A second aspect of the present invention is summarized as a mobile communication method for communicating between a mobile station and a radio base station by using a certain key, the method including the step of: (A) acquiring, at a radio base station managing a re-establishment target cell for the mobile station, a certain key from a radio base station with which the mobile station has been communicating prior to the re-establishment, in a re-establishment procedure of the mobile station, the certain key being used for communication between the mobile station and the re-establishment target cell for the mobile station.

In the first and second aspect, the mobile communication method can further include the step of: (B) updating, at the mobile station, the first key based on a re-establishment acknowledge signal received from the radio base station, after transmitting a re-establishment request signal to the radio base station.

In the first and second aspect, in the step (B), the first key is updated based on a parameter included in the re-establishment acknowledge signal.

A third aspect of the present invention is summarized as a radio base station communicating with a mobile station using a certain key, the radio base station including: an acquisition unit configured to acquire a first key for generating a certain key from a switching center in a re-establishment procedure of a mobile station, the certain key to be used for communication between the mobile station and a next re-establishment target cell for the mobile station.

A fourth aspect of the present invention is summarized as a radio base station communicating with a mobile station using a certain key, the radio base station including: an acquisition unit configured to acquire a certain key from a radio station with which the mobile station has been communicating prior to the re-establishment, in a procedure for re-establishment of a mobile station, the certain key to be used for communication between the mobile station and a re-establishment target cell for the mobile station.

In the third and fourth aspect, the radio base station can further include: a notifying unit configured to notify a parameter for updating the first key by the mobile station, after receiving a re-establishment request signal from the mobile station, the parameter being included in a re-establishment acknowledge signal.

BEST MODES FOR CARRYING OUT THE INVENTION

Mobile Communication System According to First Embodiment of The Present Invention A mobile communication system according to a first embodiment of the present invention is described referring to FIG. 1 to FIG. 4.

The mobile communication system according to this embodiment is a mobile communication system to which the LTE scheme is applied, and includes a plurality of switching centers MME#1, MME#2, . . . and a plurality of radio base stations eNB#11, eNB#12, eNB#21, eNB#22, . . . .

For example, a mobile station UE is configured to communicate, in the cell #111 under the control of the radio base station eNB#11, with the radio base station eNB#11 using a certain key described above.

Furthermore, in a re-establishment procedure for the mobile station UE, a radio base station managing a re-establishment target cell (for example, the radio base station eNB#12) is configured to acquire first keys $K_{eNB[n+1]}$, $K_{eNB[n+2]}$ and the like for generating a certain key used in communications with the mobile station UE, without using an intermediate key $K_{eNB}{}^*$ generated by a radio base station managing a re-establishment source cell (for example, the radio base station eNB#11).

Figure 1:
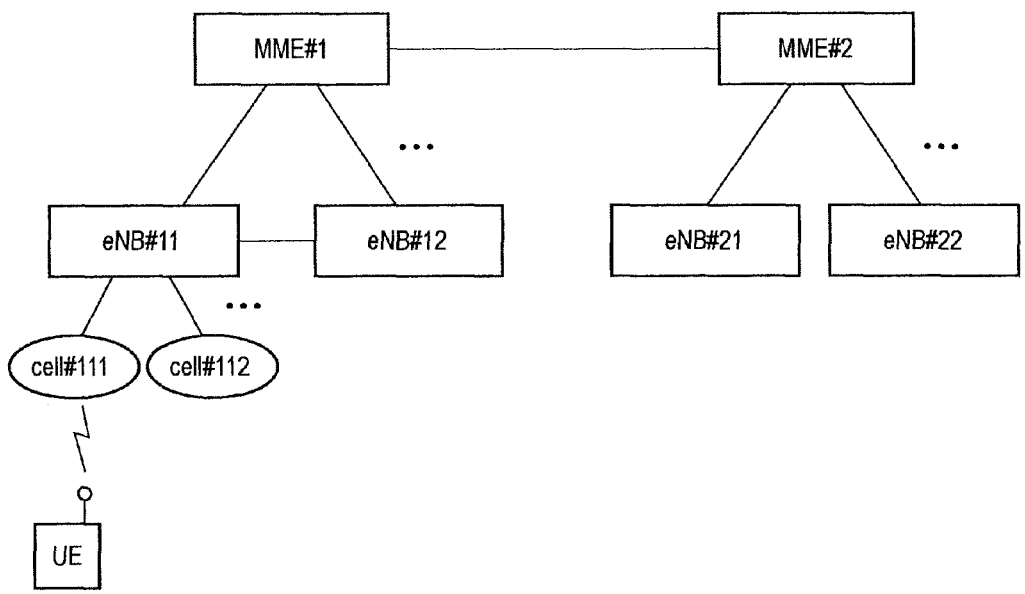
FIG. 1 is an overall configurational view of a mobile communication system according to a first embodiment of the present invention.
Figure 2:
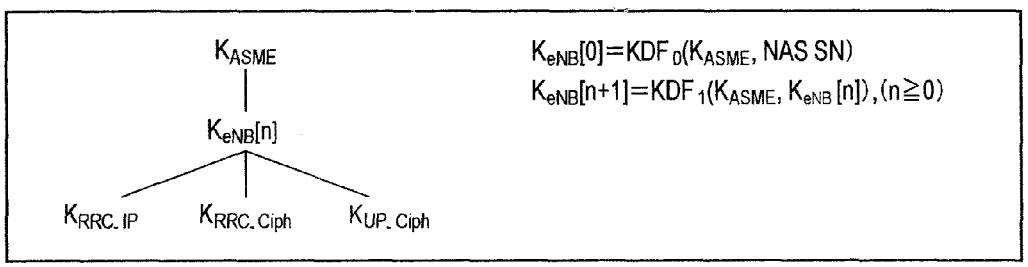
FIG. 2 is a diagram showing an example of a hierarchical structure and a calculation procedure of a key used in the mobile communication system according to the first embodiment of the present invention.

FIG. 2 shows an example of the hierarchical structure and the calculation procedure of a key used in the mobile communication system according to this embodiment (that is, a key used to calculate the certain key).

As shown in FIG. 2, a key $K_{RRC\_IP}$ used for "Integrity Protection" in the RRC protocol, a key $K_{RRC\_Ciph}$ used for "Ciphering" in the RRC protocol, and a key $K_{UP\_Ciph}$ used for "Ciphering" in the U-plane of AS are generated using a first key $K_{eNB[n]}$.

The first key $K_{eNB[n]}$ is calculated by using a master key $K_{ASME}$ from the formulas given below.

$$K_{eNB[0n]} = KDF_0(K_{ASME}, NAS\ SN)$$

$$K_{eNB[n+1]} = KDF_1(K_{ASME}, K_{eNB[n]}), (n \geq 0)$$

Here, the master key $K_{ASME}$ is known only to the mobile station UE and the switching center MME, but must not be known to the radio base station eNB.

Furthermore, NAS SN is a sequence number (SN) of a NAS protocol which is the C-plane protocol between the mobile station UE and the switching center MME (Non Access Stratum, NAS).

Figure 3:
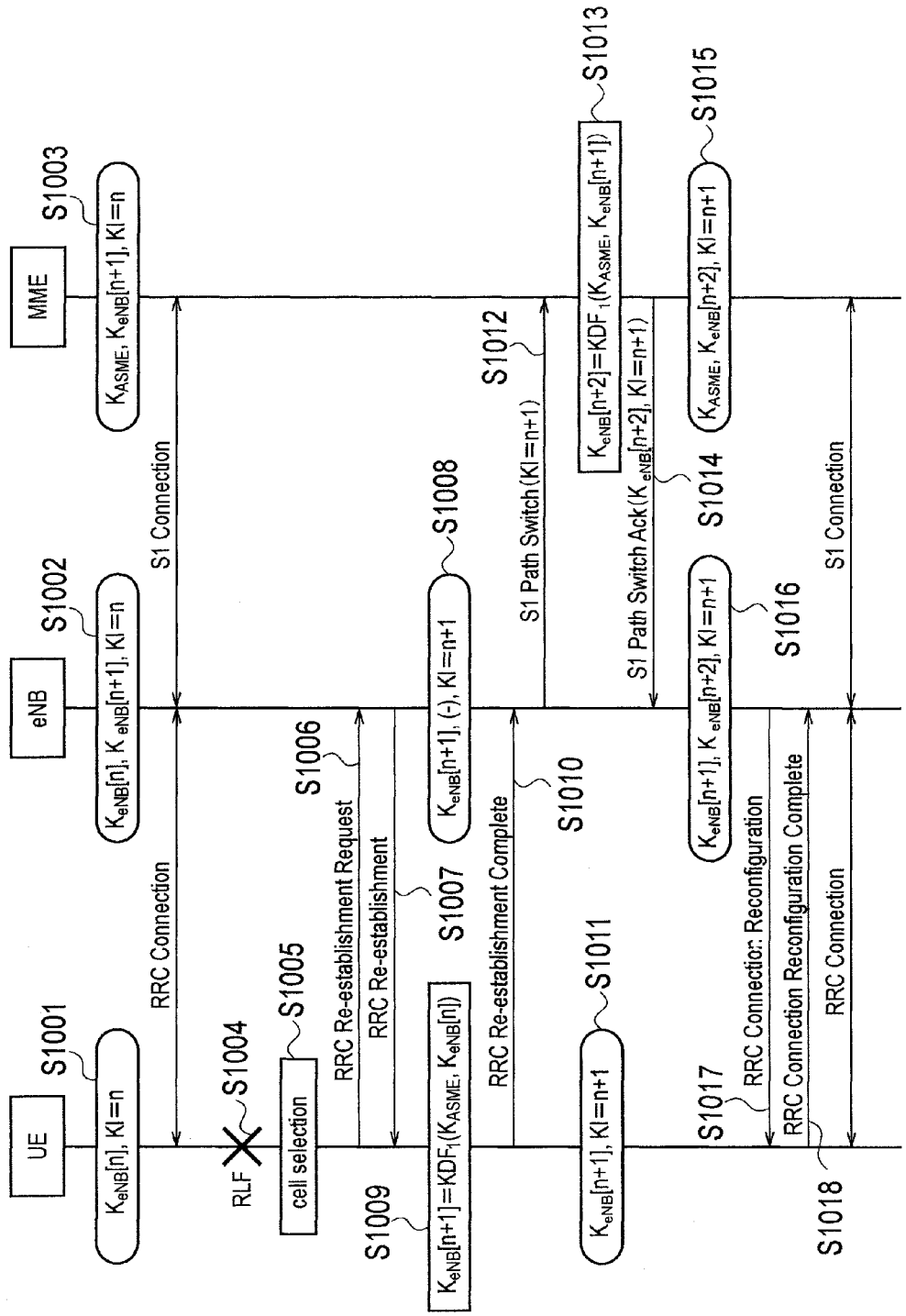
FIG. 3 is a sequence diagram showing an Intra-eNB re-establishment procedure in the mobile communication system according to the first embodiment of the present invention.
Figure 4:
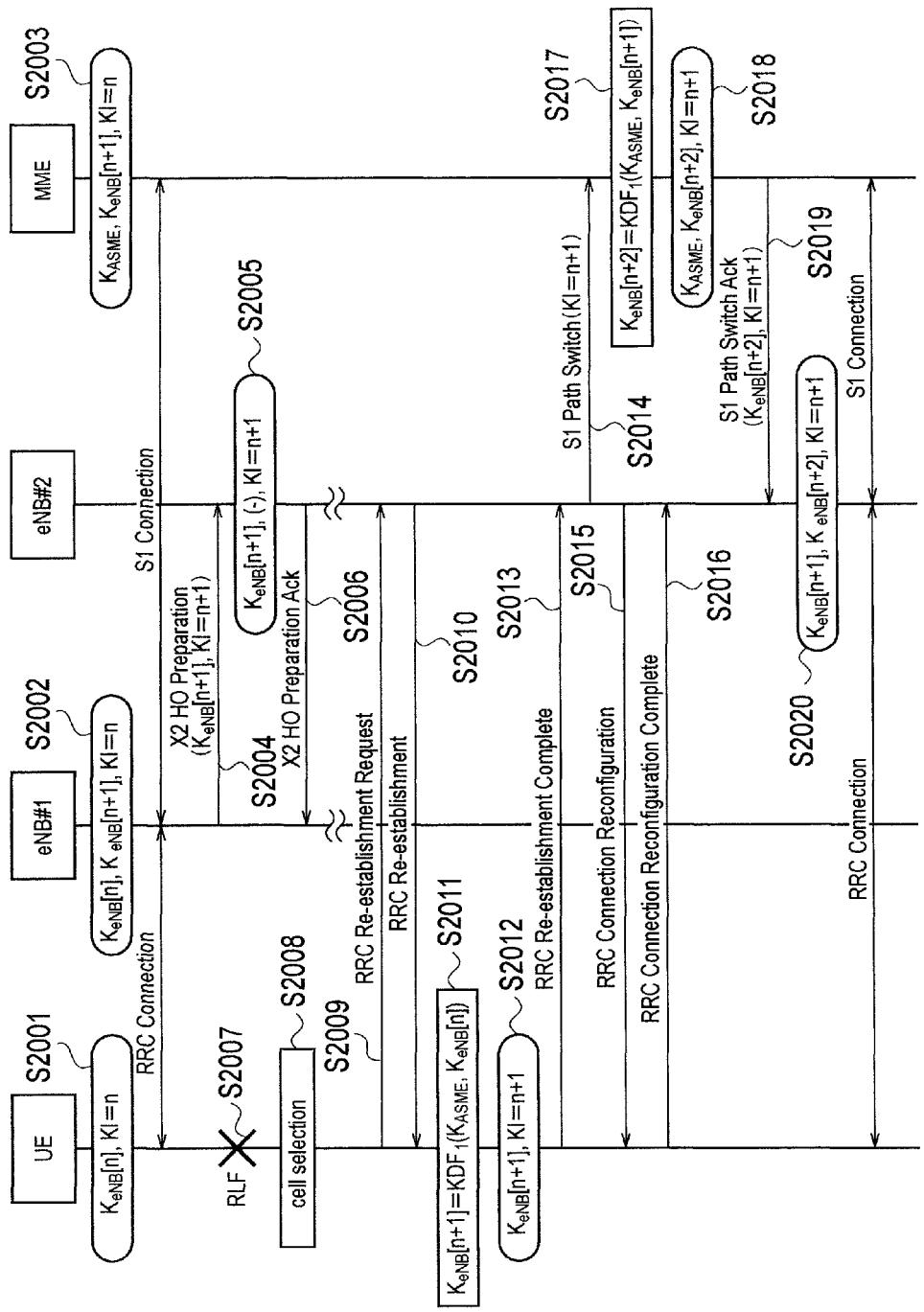
FIG. 4 is a sequence diagram showing an Inter-eNB re-establishment procedure in the mobile communication system according to the first embodiment of the present invention.

Hereafter, operations of the mobile communication system according to this embodiment are described referring to FIG. 3 and FIG. 4.

First, the intra-eNB re-establishment procedure (intra radio base station re-establishment procedure) in the mobile communication system according to this embodiment is described referring to FIG. 3.

As shown in FIG. 3, before starting the intra-eNB re-establishment procedure, the mobile station UE holds $K_{eNB[n]}$ and "KI (=n)" (step S1001), the radio base station eNB holds $K_{eNB[n]}$, $K_{eNB[n+1]}$ and "KI (=n)" (step S1002), and the switching center MME holds $K_{ASME}$, $K_{eNB[n+1]}$ and "K1 (=n)" (step S1003).

In step S1004, where the RRC connection has been established between the mobile station UE and the radio base station eNB and the S1 connection has been established between the radio base station eNB and the switching center MME, the mobile station UE detects radio link failure (RLF) in the RRC connection described above. For example, the mobile station UE detects the RLF in the following cases.

When RSRP (Reference Signal Received Power) in the RRC connection is lower than a predetermined threshold for a predetermined period of time.

When the random access procedure is not successful.

When the handover procedure fails.

Thereafter, the mobile station UE performs a cell selection processing in step S1005, and transmits, in step S1006, "RRC Connection Re-establishment Request (re-establishment request signal)" to a selected cell (or the radio base station eNB managing the selected cell) via a common control channel.

In step S1007, the radio base station eNB transmits "RRC Connection Re-establishment (re-establishment acknowledge signal)" to the mobile station UE. The "RRC Connection Re-establishment" may include "KI (=n+1)".

Here, the radio base station eNB holds $K_{eNB[n+1]}$ and "KI (=n+1)" (step S1008).

In step S1109, the mobile station UE calculates $K_{eNB[n+1]}$ from the formula given below and, in step S1010, using such $K_{eNB[n+1]}$, transmits "RRC Connection Re-establishment Complete (re-establishment complete signal)" to the radio base station eNB.

$$K_{eNB[n+1]} = KDF_1(K_{ASME}, K_{eNB[n]})$$

Here, the mobile station UE holds $K_{eNB[n+1]}$ and "KI (=n+1)" (step S1011).

In step S1012, the radio base station eNB transmits, to the switching center MME, "S1 Path Switch (path switch signal)" including "KI (=n+1)".

In step S1013, the switching center MME calculates $K_{eNB[n+2]}$ from the formula given below and, in step S1014, transmits, to the radio base station eNB, "S1 Path Switch Pick (path switch acknowledge signal)" including $K_{eNB[n+2]}$ and "KI (=n+1)".

$$K_{eNB[n+2]} = KDF_1(K_{ASME}, K_{eNB[n+1]})$$

Here, the switching center MME holds $K_{ASME}$, $K_{eNB[n+2]}$ and "KI (=n+1)" (in step S1015).

In step S1016, the radio base station eNB receives "S1 Path Switch Ack" and holds $K_{eNB[n+1]}$, $K_{eNB[n+2]}$ and "KI (=n+1)".

That is, here, the radio base station eNB managing the re-establishment target cell acquires the first key $K_{eNB[n+2]}$ for generating a certain key to be used in communications between the mobile station UE and a next re-establishment target cell for the mobile station UE.

In step S1017, the radio base station eNB transmits, to the mobile station UE, "RRC Connection Reconfiguration" and in step S1018, the mobile station UE transmits, to the radio base station eNB, "RRC Connection Reconfiguration Complete".

According to the procedure described above, $K_{eNB}$ and the certain key are updated in the Intra-eNB re-establishment procedure.

As shown in FIG. 4, before starting the intra-eNB re-establishment procedure, the mobile station UE holds $K_{eNB[n]}$ and "KI (=n)" (step S2001), the radio base station eNB#1 holds $K_{eNB[n]}$, $K_{eNB[n+1]}$ and "KI (=n)" (step S2002), and the switching center MME holds $K_{ASME}$, $K_{eNB[n+1]}$ and "KI (=n)" (step S2003).

In step S2004, the radio base station eNB#1 transmits, to a neighbor radio base station eNB#2, "X2 HO Preparation (handover preparation signal)" including $K_{eNB[n+1]}$ and "KI (=n+1)".

In step S2005, the radio base station eNB#2 stores the received $K_{eNB[n+1]}$ and "KI (=n+1)" and, in step S2006, transmits, to the radio base station eNB#1, "X2 HO Preparation Ack (handover preparation acknowledge signal)".

That is, here, the radio base station eNB#2 managing the re-establishment target cell acquires the first key $K_{eNB[n+1]}$ for generating a certain key to be used in communications with the mobile station UE.

In step S2007, where the RRC connection has been established between the mobile station UE and the radio base station eNB#1 and the S1 connection has been established between the radio base station eNB#1 and the switching center MME, the mobile station UE detects RLF in the RRC connection described above.

Thereafter, the mobile station UE performs a cell selection processing in step S2008, and transmits, in step S2009, "RRC Connection Re-establishment Request (re-establishment request signal)" to a selected cell (or the re-establishment target base station) eNB#2 via a common control channel.

In step S2010, the re-establishment target base station eNB#2 transmits "RRC Connection Re-establishment (re-establishment acknowledge signal)" to the mobile station UE. The "RRC Connection Re-establishment" may include "KI (=n+1)".

In step S2011, the mobile station UE calculates $K_{eNB[n+1]}$ from the formula given below and, in step S2013, using such $K_{eNB[n+1]}$, transmits "RRC Connection Re-establishment Complete (re-connection complete signal)" to the re-establishment target base station eNB#2.

$$K_{eNB[n+1]} = KDF_1(K_{ASME}, K_{eNB[n]})$$

Here, the mobile station UE holds $K_{eNB[n+1]}$ and "KI (=n+1)" (step S2012).

In step S2014, the radio base station eNB#2 transmits, to the switching center MME, "S1 Path Switch (path switch signal)" including "KI (=n+1)".

In step S2015, the radio base station eNB#2 transmits, to the mobile station UE, "RRC Connection Reconfiguration" and in step S2016, the mobile station UE transmits, to the radio base station eNB#2, "RRC Connection Reconfiguration Complete".

In step S2017, the switching center MME calculates $K_{eNB[n+2]}$ from the formula given below and, in step S2019, transmits, to the re-establishment target base station eNB#2, "S1 Path Switch Ack (path switch acknowledge signal)" including $K_{eNB[n+2]}$ and "KI (=n+1)".

$$K_{eNB[n+2]} = KDF_1(K_{ASME}, K_{eNB[n+1]})$$

Here, the switching center MME holds $K_{ASME}$, $K_{eNB[n+2]}$ and "KI (=n+1)" (step S2018).

In step S2020, the re-establishment target base station eNB#2 receives the "S1 Path Switch Ack" and holds $K_{eNB[n+1]}$, $K_{eNB[n+2]}$ and "KI (=n+1)".

That is, here, the radio base station eNB#2 managing the re-establishment target cell acquires the first key $K_{eNB[n+2]}$ for generating a certain key to be used in communications between the mobile station UE and a next re-establishment target cell for the mobile station UE.

According to the procedure described above, $K_{eNB}$ and the certain key are updated in the Intra-eNB re-establishment procedure.

(Operations and Effects of Mobile Communication System According to First Embodiment of the Present Invention)

In the mobile communication system according to the first embodiment of the present invention, $K_{eNB[n+1]}$ and the like to be used at the radio base station eNB or eNB#2 managing the re-establishment target cell can be generated through a simplified procedure.

(Mobile Communication System According to Second Embodiment of the Present Invention)

Figure 5:
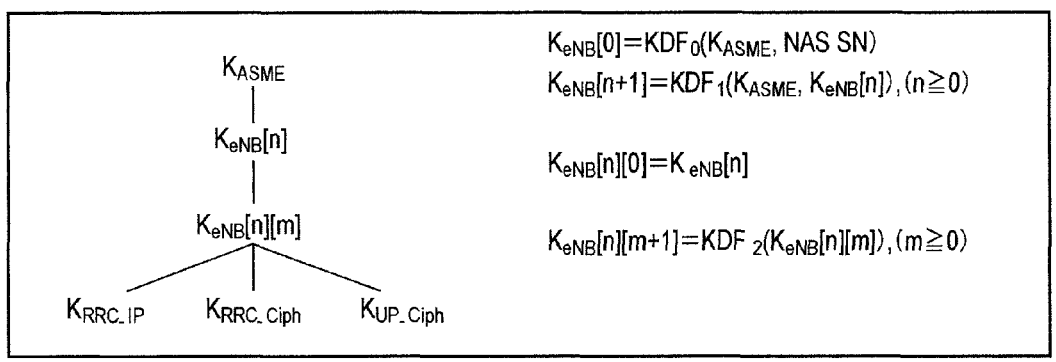
FIG. 5 is a sequence diagram showing an example of a hierarchical structure and a calculation procedure of a key used in a mobile communication system according to a second embodiment of the present invention.
Figure 6:
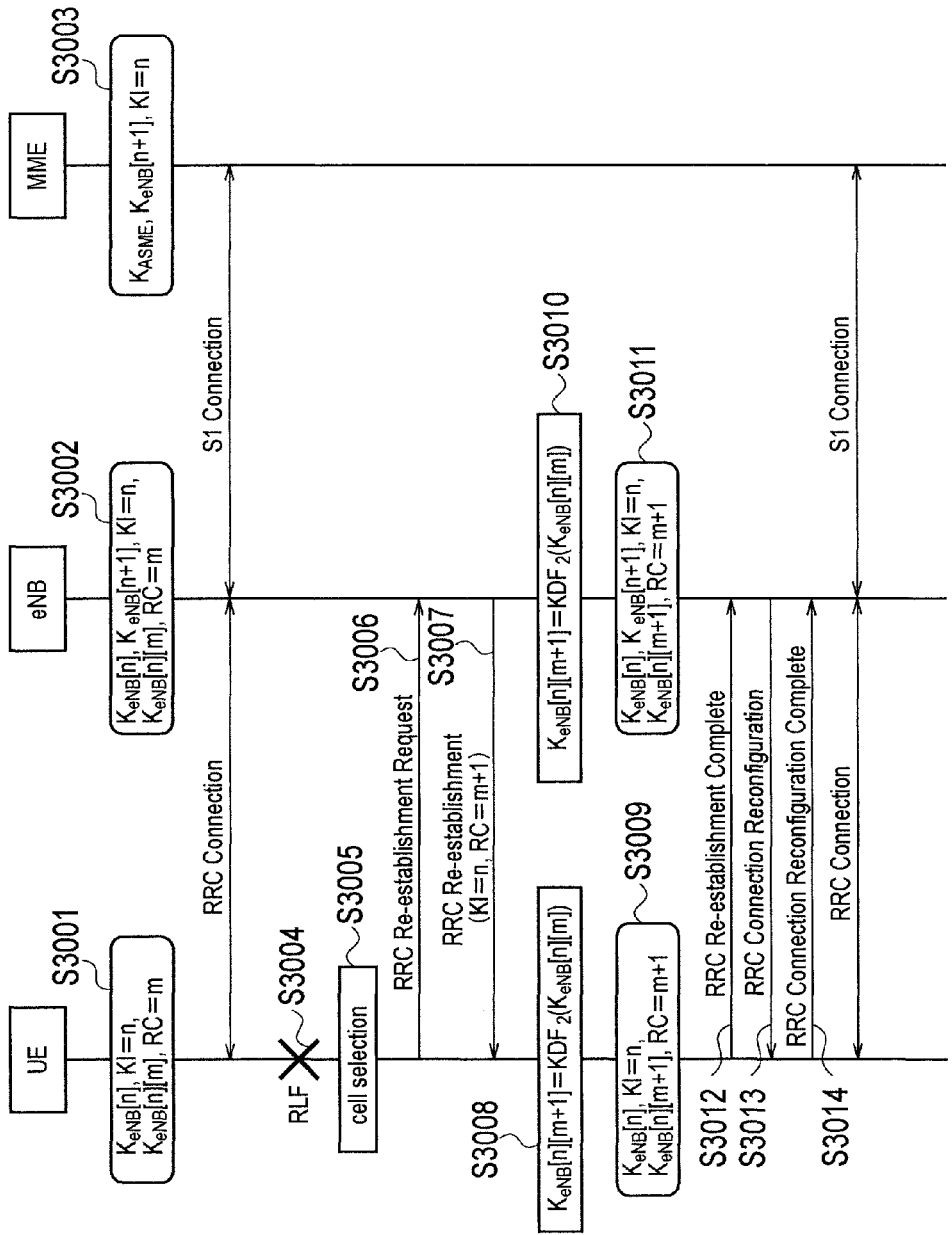
FIG. 6 is a sequence diagram showing an Intra-eNB re-establishment procedure in the mobile communication system according to the second embodiment of the present invention.
Figure 7:
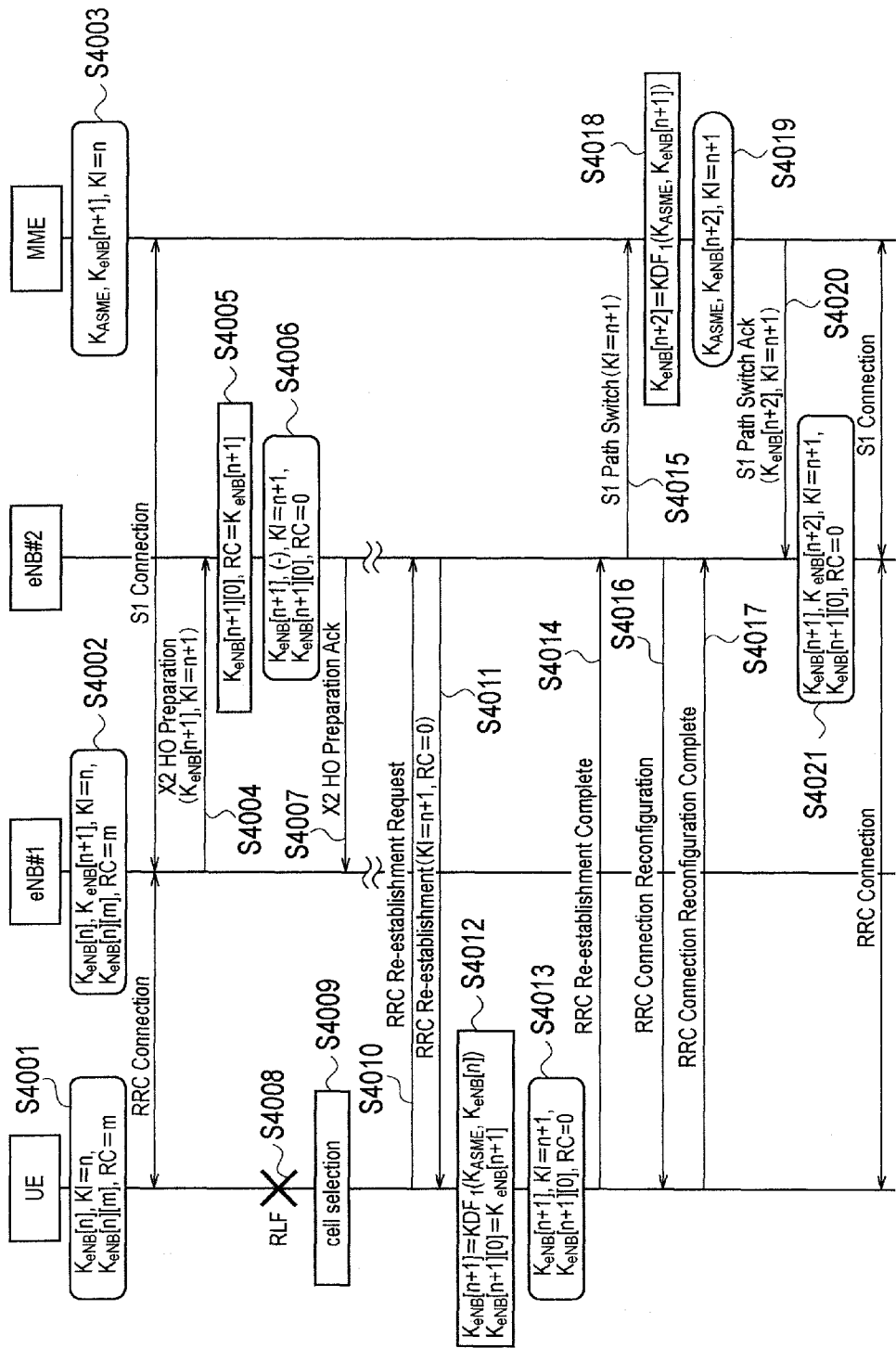
FIG. 7 is a sequence diagram showing an Inter-eNB re-establishment procedure in the mobile communication system according to the second embodiment of the present invention.
Figure 8:
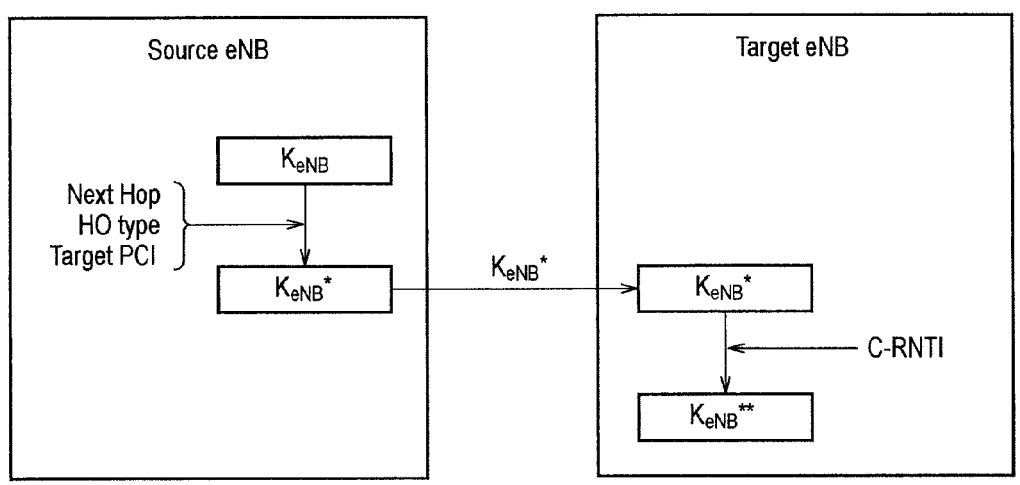
FIG. 8 is a diagram showing an example of the calculation procedure of a key used in a mobile communication system according to a conventional technique.

Referring to FIG. 5 to FIG. 7, a mobile communication system according to a second embodiment of the present invention is described by focusing on differences from the above described mobile communication system according to the first embodiment of the present invention.

FIG. 5 shows an example of the hierarchical structure and the calculation procedure of a key used in the mobile communication system according to this embodiment (that is, a key used to calculate the certain key).

As shown in FIG. 5, a key $K_{RRC\_IP}$ used for "Integrity Protection" in the RRC protocol, a key $K_{RRC\_Ciph}$ used for "Ciphering" in the RRC protocol, and a key $K_{UP\_Ciph}$ used for "Ciphering" in the U-plane of AS are generated using $K_{eNB[n][m]}$.

$K_{eNB[n][m]}$ is calculated by using $K_{eNB[n]}$ from the formulas given below.

$$K_{eNB[n][0]} = K_{eNB[n]}$$

$$K_{eNB[n][m+1]} = KDF_2(K_{eNB[n][m]}), (m \geq 0)$$

Furthermore, $K_{eNB[n]}$ is calculated from the formulas given below using $K_{ASME}$.

$$K_{eNB[0]} = KDF_0(K_{ASME}, NAS\ SN)$$

$$K_{eNB[n+1]} = KDF_1(K_{ASME}, K_{eNB[n]}), (n \geq 0)$$

Hereafter, operations of the mobile communication system according to this embodiment are described referring to FIG. 6 and FIG. 7.

First, the intra-eNB re-establishment procedure (intra radio base station re-establishment procedure) in the mobile communication system according to this embodiment is described referring to FIG. 6.

As shown in FIG. 6, before starting the intra-eNB re-establishment procedure, the mobile station UE holds $K_{eNB[n]}$, $K_{eNB[n]\ [m]}$, "KI (=n)" and "RC (=m)" (step S3001), the radio base station eNB holds $K_{eNB[n]}$, $K_{eNB[n+1]}$, $K_{eNB[n]\ [m]}$, "KI (=n)" and "RC (=m)" (step S3002), and the switching center MME holds $K_{ASME}$, $K_{eNB[n+1]}$ and "KI (=n)" (step S3003).

In step S3004, where the RRC connection has been established between the mobile station UE and the radio base station eNB and the S1 connection has been established between the radio base station eNB and the switching center MME, the mobile station UE detects radio link failure (RLF) in the RRC connection described above.

Thereafter, the mobile station UE performs a cell selection processing in step S3005, and transmits, in step S3006, "RRC Connection Re-establishment Request (re-establishment request signal)" to a selected cell (or the radio base station eNB managing the selected cell) via a common control channel.

In step S3007, the radio base station eNB transmits, to the mobile station UE, "RRC Connection Re-establishment (re-establishment acknowledge signal)" including "KI (=n)" and "RC (=m+1)".

Here, in step S3008, the mobile station UE calculates $K_{eNB[n]\ [m+1]}$ from the formula given below and, in step S3009, holds $K_{eNB[n]}$, $K_{eNB[n]\ [m+1]}$, "KI (=n+1)" and "RC (m+1)".

$$K_{eNB[n][m+1]} = KDF_2(K_{eNB[n][m]})$$

Similarly, in step S3010, the radio base station eNB calculates $K_{eNB[n]}$ from the formula given below, and in step S3011, holds $K_{eNB[n]}$, $K_{eNB[n+1]}$, $K_{eNB[n]\ [m+1]}$, "KI (n+1)" and "RC (=mil)".

$$K_{eNB[n][m+1]} = KDF_2(K_{eNB[n][m]})$$

In step S3012, the mobile station UE transmits, to the radio base station eNB, "RRC Connection Re-establishment Complete (re-establishment complete signal)" using the above-mentioned $K_{eNB[n+1]}$.

In step S3013, the radio base station eNB transmits, to the mobile station UE, "RRC Connection Reconfiguration", and in step S3014, the mobile station UE transmits, to the radio base station eNB, "RRC Connection Reconfiguration Complete".

According to this embodiment, "Path Switch" in the Intra-eNB re-establishment procedure can be eliminated.

Secondly, the intra-eNB re-establishment procedure (e-establishment procedure between different mobile stations) in the mobile communication system according to this embodiment is described referring to FIG. 7.

As shown in FIG. 7, before starting the intra-eNB re-establishment procedure, the mobile station UE holds $K_{eNB[n]}$, $K_{eNB[n]\ [m]}$, "KI (=n)" and "RC (=m)" (step S4001), the radio base station eNB#1 holds $K_{eNB[n]}$, $K_{eNB[n+1]}$, $K_{eNB[n]\ [m]}$, "KI (=n)" and "RC (=m)" (step S4002), and the switching center MME holds $K_{ASME}$, $K_{eNB[n+1]}$ and "KI (=n)" (step S4003).

In step S4004, the radio base station eNB#1 transmits, to a neighbor radio base station eNB#2, "X2 HO Preparation (handover preparation signal)" including $K_{eNB[n+1]}$ and "KI (=n+1)".

In steps S4005 and S4006, the radio base station eNB#2 stores $K_{eNB[n+1]}$, $K_{eNB[n+1]\ [0]}$, "KI (=n+1)" and "RC (=0)". Here, assume $K_{eNB[n+1]\ [0]} = K_{eNB[n+1]}$.

In step S4007, the radio base station eNB#2 transmits, to the radio base station eNB#1, "X2 HO Preparation Ack (handover preparation acknowledge signal)".

That is, here, the radio base station eNB#2 managing the re-establishment target cell acquires the first key $K_{eNB[n+1]\ [0]}$ for generating a certain key to be used in communication with the mobile station UE.

In step S4008, where the RRC connection has been established between the mobile station UE and the radio base station eNB#1 and the S1 connection has been established between the radio base station eNB#1 and the switching center MME, the mobile station UE detects RLF in the RRC connection described above.

Thereafter, the mobile station UE performs a cell selection processing in step S4009, and transmits, in step S4010, "RRC Connection Re-establishment Request (re-establishment request signal)" to a re-establishment target cell (or the re-establishment target radio base station) eNB#2 via a common control channel.

In step S4011, the re-establishment target radio base station eNB#2 transmits, to the mobile station UE, "RRC Connection Re-establishment" including "KI (=n+1)" and "RC (=0)".

In step S4012, the mobile station UE calculates $K_{eNB[n+1]}$ and $K_{eNB[n+1]\ [0]}$ from the formulas given below, and in step S4013, holds $K_{eNB[n+1]}$, $K_{eNB[n+1]\ [0]}$, "KI (=n+1)" and "RC (=0)".

$$K_{eNB[n+1]} = KDF_1(K_{ASME}, K_{eNB[n]})$$

$$K_{eNB[n+1][0]} = K_{eNB[n+1]}$$

In step S4014, the mobile station UE transmits, to the re-establishment target radio base station eNB#2, "RRC Connection Re-establishment Complete" using the above mentioned $K_{eNB[n+1]}$.

In step S4015, the re-establishment target radio base station eNB#2 transmits, to the switching center MME, "S1 Path Switch" including "KI (=n+1)".

In step S4016, the re-establishment target radio base station eNB#2 transmits, to the mobile station UE, "RRC Connection Reconfiguration" and in step S4017, the mobile station UE transmits, to the re-establishment target radio base station eNB#2, "RRC Connection Reconfiguration Complete".

In step S4018, the switching center MME calculates $K_{eNB[n+2]}$ from a formula given below, and, in step S4019, holds $K_{ASME}$, $K_{eNB[n+2]}$ and "KI (=n+1)".

$$K_{eNB[n+2]} = KDF_1(K_{ASME}, K_{eNB[n+1]})$$

In step S4020, the switching center MME transmits, to the re-establishment target radio base station eNB#2, "S1 Path Switch Ack" including $K_{eNB[n+2]}$ and "KI (=n+1)".

Here, in step S4021, the re-establishment target radio base station eNB#2 holds $K_{eNB[n+1]}$, $K_{eNB[n+2]}$, "KI (=n+1)", $K_{eNB[n+1]\ [0]}$ and "RC (=0)".

As shown in FIG. 6 and FIG. 7, by introducing $K_{eNB}$ in updating at the radio base station using the parameter "RC", $K_{eNB}$ can be updated while eliminating an inquiry to the switching center MME.

Meanwhile, in the procedures shown in FIG. 6 and FIG. 7, the parameter "RC" may be omitted from "RRC Re-establishment".

When the parameter "RC" is omitted from "RRC Re-establishment", necessity of incrementing "RC" can be determined by determining whether the parameter "KI" has been incremented or not.

If the "KI" has been incremented, "RC" may be reset to "0", whereas if the "KI" has not been incremented, "RC" may be incremented.

Alternatively, if the parameter "RC" is omitted from "RRC Re-establishment", the mobile station UE may, on a trial basis, maintain the present value of "RC", increment "RC" or reset "RC" to "0", and then check "Integrity" with respect to a message received for each of the cases to autonomously determine which one of the cases is correct.

(Modification)

Note that operation of the above described switching center MME, the mobile station UE and the radio base station eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the switching center MME, the mobile station UE and the radio base station eNB. Also, the storage medium and the processor may be provided in the switching center MME, the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method for communicating between a mobile station and a radio base station via a radio link by using a certain key, the method comprising the steps of:

(A) transmitting, from the mobile station to the radio base station, a re-establishment request signal, detecting radio link failure; and (B) performing a reconfiguration of the radio link between the mobile station and the radio base station in response to the transmission of the re-establishment request signal; wherein in the step (B), the radio base station transmits, to the mobile station, a re-establishment acknowledge signal including an index parameter for identifying a second key for calculating a first key for generating the certain key to be used in the radio base station after a re-establishment procedure, and the mobile station calculates the first key to be stored in the mobile station by using the second key identified by the index parameter included in the received re-establishment acknowledge signal.

2. The mobile communication method according to claim 1, wherein the first key is identified by a first index parameter and a second index parameter; and in the step (B), the radio base station transmits, to the mobile station, the re-establishment acknowledge signal which includes the first index parameter and does not include the second index parameter.

3. The mobile communication method according to claim 2, wherein in the step (B), the mobile station resets the second index parameter when the first index parameter included in the received re-establishment acknowledge signal is incremented, and increments the second index parameter when the first index parameter is not incremented.

4. A radio base station communicating with a mobile station via a radio link using a certain key, the radio base station comprising:

a receiver unit configured to receive a re-establishment request signal from the mobile station; and a reconfiguration unit configured to performing a reconfiguration of the radio link with the mobile station, in accordance with the re-establishment request signal; wherein the reconfiguration unit is configured to transmit, to the mobile station, a re-establishment acknowledge signal including an index parameter for identifying a second key for calculating a first key for generating the certain key to be used in the radio base station after a re-establishment procedure.

5. The radio base station according to claim 4, wherein the first key is identified by a first index parameter and a second index parameter; and the reconfiguration unit is configured to transmit, to the mobile station, the re-establishment acknowledge signal which includes the first index parameter and does not include the second index parameter.

6. A mobile station communicating with a radio base station via a radio link using a certain key, the mobile station comprising:

a transmitter unit configured to transmit, to the radio base station, a re-establishment request signal, detecting radio link failure; and a reconfiguration unit configured to perform a reconfiguration of the radio link with the radio base station; wherein the reconfiguration unit is configured to calculate a first key to be stored in the mobile station, when receiving, from the radio base station, a re-establishment acknowledge signal including an index parameter for identifying a second key for calculating the first key, the first key being a key for generating the certain key to be used in the radio base station after a re-establishment procedure.

7. The mobile station according to claim 6, wherein the first key is identified by a first index parameter and a second index parameter; and the reconfiguration unit is configured to calculate the first key to be stored in the mobile station by using the second key identified by the first index parameter, when receiving the re-establishment acknowledge signal which includes the first index parameter and does not include the second index parameter.

8. The mobile station according to claim 7, wherein the reconfiguration unit is configured to reset the second index parameter when the first index parameter included in the received re-establishment acknowledge signal is incremented, and to increment the second index parameter when the first index parameter is not incremented.

* * * * *